US010402229B2

(12) United States Patent
Dimitrov et al.

(10) Patent No.: US 10,402,229 B2
(45) Date of Patent: Sep. 3, 2019

(54) PLATFORM FOR ORCHESTRATING CUSTOM PROCESSES ACROSS SYSTEM LANDSCAPES

(71) Applicant: SAP SE, Walldorf (DE)

(72) Inventors: Petar Dimitrov, Sofia (BG); Jochen Wilhelm, Sandhausen (DE); Dimitar Bankov, Sofia (BG); Ivan Tsankov, Sofia (BG); Benjamin Hoke, Bad Schoenborn (DE)

(73) Assignee: SAP SE, Walldorf (DE)

( * ) Notice: Subject to any disclaimer, the term of this patent is extended or adjusted under 35 U.S.C. 154(b) by 112 days.

(21) Appl. No.: 15/420,298

(22) Filed: Jan. 31, 2017

(65) Prior Publication Data

US 2018/0217869 A1    Aug. 2, 2018

(51) Int. Cl.
*G06F 9/48* (2006.01)
*G06F 9/50* (2006.01)
*G06F 8/60* (2018.01)
*G06F 8/61* (2018.01)
*G06F 8/65* (2018.01)
(Continued)

(52) U.S. Cl.
CPC .............. *G06F 9/5038* (2013.01); *G06F 8/60* (2013.01); *G06F 8/61* (2013.01); *G06F 8/62* (2013.01); *G06F 8/65* (2013.01); *G06F 8/70* (2013.01); *G06F 8/76* (2013.01); *G06F 9/48* (2013.01); *G06F 9/4843* (2013.01); *G06F 9/4881* (2013.01); *G06F 9/4887* (2013.01); *G06F 9/50* (2013.01); *G06F 9/5005* (2013.01); *G06F 9/5011* (2013.01); *G06F 9/5027* (2013.01); *G06F 9/5044* (2013.01); *G06F 9/5061* (2013.01)

(58) Field of Classification Search
CPC ..... G06F 8/60; G06F 8/61; G06F 8/65; G06F 8/70; G06F 8/62; G06F 8/76; G06F 9/48; G06F 9/4843; G06F 9/4881; G06F 9/4887; G06F 9/50; G06F 9/5011; G06F 9/5027; G06F 9/5038; G06F 9/5044; G06F 9/5005; G06F 9/5061
See application file for complete search history.

(56) References Cited

U.S. PATENT DOCUMENTS

| 2002/0100036 A1* | 7/2002 | Moshir | G06F 8/62 717/173 |
| 2002/0129356 A1* | 9/2002 | Hellerstein | G06F 8/61 717/177 |

(Continued)

*Primary Examiner* — Charles M Swift
(74) *Attorney, Agent, or Firm* — Fish & Richardson P.C.

(57) ABSTRACT

Methods, systems, and computer-readable storage media for receiving a request to execute a custom process over a target system, the custom process including one or more operations, determining, for each operation of the custom process, a set of entities implicated by a respective operation based on an operations graph of the custom process, and relations paths of the respective operation, determining, for each set of entities, a sub-set of entities based on one or more constraints of the respective operation, providing, for each operation of the custom process, an operation process that is to be executed over one or more entities of a respective sub-set of entities, combining operation processes into a single custom process, and initiating execution of the single custom process.

20 Claims, 7 Drawing Sheets

(51) Int. Cl.
  *G06F 8/70* (2018.01)
  *G06F 8/76* (2018.01)

(56) References Cited

U.S. PATENT DOCUMENTS

| | | | | |
|---|---|---|---|---|
| 2005/0132350 A1* | 6/2005 | Markley | ................... | G06F 8/65 |
| | | | | 717/168 |
| 2005/0257214 A1* | 11/2005 | Moshir | ..................... | G06F 8/62 |
| | | | | 717/171 |
| 2006/0080653 A1* | 4/2006 | Siwatu | ..................... | G06F 8/61 |
| | | | | 717/173 |
| 2006/0080656 A1* | 4/2006 | Cain | ........................ | G06F 8/65 |
| | | | | 717/173 |
| 2006/0101457 A1* | 5/2006 | Zweifel | .................... | G06F 8/65 |
| | | | | 717/174 |
| 2009/0106748 A1* | 4/2009 | Chess | ....................... | G06F 8/65 |
| | | | | 717/168 |
| 2010/0299664 A1* | 11/2010 | Taylor | ....................... | G06F 8/65 |
| | | | | 717/173 |
| 2012/0005647 A1* | 1/2012 | Dolby | ...................... | G06F 8/75 |
| | | | | 717/105 |
| 2013/0055228 A1* | 2/2013 | Song | ....................... | G06F 8/654 |
| | | | | 717/168 |
| 2014/0237463 A1* | 8/2014 | Sriram | ..................... | G06F 8/65 |
| | | | | 717/172 |
| 2014/0373004 A1* | 12/2014 | Gbadegesin | ............. | G06F 8/65 |
| | | | | 717/173 |
| 2015/0089488 A1* | 3/2015 | Anderson | ................ | G06F 8/65 |
| | | | | 717/172 |
| 2015/0324184 A1* | 11/2015 | Foley | .................... | H04L 67/10 |
| | | | | 717/173 |
| 2015/0378712 A1* | 12/2015 | Cameron | .................. | G06F 8/65 |
| | | | | 717/169 |
| 2016/0162275 A1* | 6/2016 | Morley | ..................... | G06F 8/65 |
| | | | | 717/170 |
| 2017/0090904 A1* | 3/2017 | Shida | ....................... | G06F 8/65 |

\* cited by examiner

PLATFORM FOR ORCHESTRATING CUSTOM PROCESSES ACROSS SYSTEM LANDSCAPES

BACKGROUND

An enterprise can operate a software system that is accessed by a plurality of users (e.g., enterprise customers). An example software system can be provided to manage system landscapes of respective users (e.g., individuals, a group of individuals of a customer enterprise). In some examples, a system landscape includes a collection of respective systems operated by and/or on behalf of a particular user. For example, a system landscape can include one or more software systems, and/or one or more database systems.

In some examples, an enterprise can provide landscape management services, which can be used to manage system landscapes of respective users. Landscape management can include, for example, performing maintenance procedures on one or more components of a system landscape (e.g., testing, updating, upgrading). In some instances, landscape management can include one or more operations that are to be executed across components of a system landscape, which operations are to be orchestrated. Traditional orchestration techniques use non-custom, static and predefined atomic, composite and provisioning operations with limited scope and high complexity. This results in difficulties in providing landscape management services.

SUMMARY

Implementations of the present disclosure include computer-implemented methods for orchestrating custom processes across system landscapes. In some implementations, actions include receiving a request to execute a custom process over a target system, the custom process including one or more operations, determining, for each operation of the custom process, a set of entities implicated by a respective operation based on an operations graph of the custom process, and relations paths of the respective operation, determining, for each set of entities, a sub-set of entities based on one or more constraints of the respective operation, providing, for each operation of the custom process, an operation process that is to be executed over one or more entities of a respective sub-set of entities, combining operation processes into a single custom process, and initiating execution of the single custom process. Other implementations of this aspect include corresponding systems, apparatus, and computer programs, configured to perform the actions of the methods, encoded on computer storage devices.

These and other implementations can each optionally include one or more of the following features: determining sets of entities and sub-sets of entities is performed by a custom process resolver based on input provided from a relations framework and a constraints framework; the custom process is defined as a class including attributes; an operation is defined as a class including at least one constraint, and at least one relation; the operations graph includes a computer-readable representation of a directed graph comprising nodes and edges between nodes; the constraints include one or more of a static constraint and a dynamic constraint; and each operation of the one or more operations includes an operation for landscape management of a system landscape including the target system.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to orchestrating custom processes across system landscapes. More particularly, and as described in further detail herein, implementations of the present disclosure provide a platform including a simple, dynamic, and extensible framework for creating and executing custom processes to orchestrate operations across system landscapes. Implementations can include actions of receiving a request to execute a custom process over a target system, the custom process including one or more operations, determining, for each operation of the custom process, a set of entities implicated by a respective operation based on an operations graph of the custom process, and relations paths of the respective operation, determining, for each set of entities, a sub-set of entities based on one or more constraints of the respective operation, providing, for each operation of the custom process, an operation process that is to be executed over one or more entities of a respective sub-set of entities, combining operation processes into a single custom process, and initiating execution of the single custom process.

Figure 1:
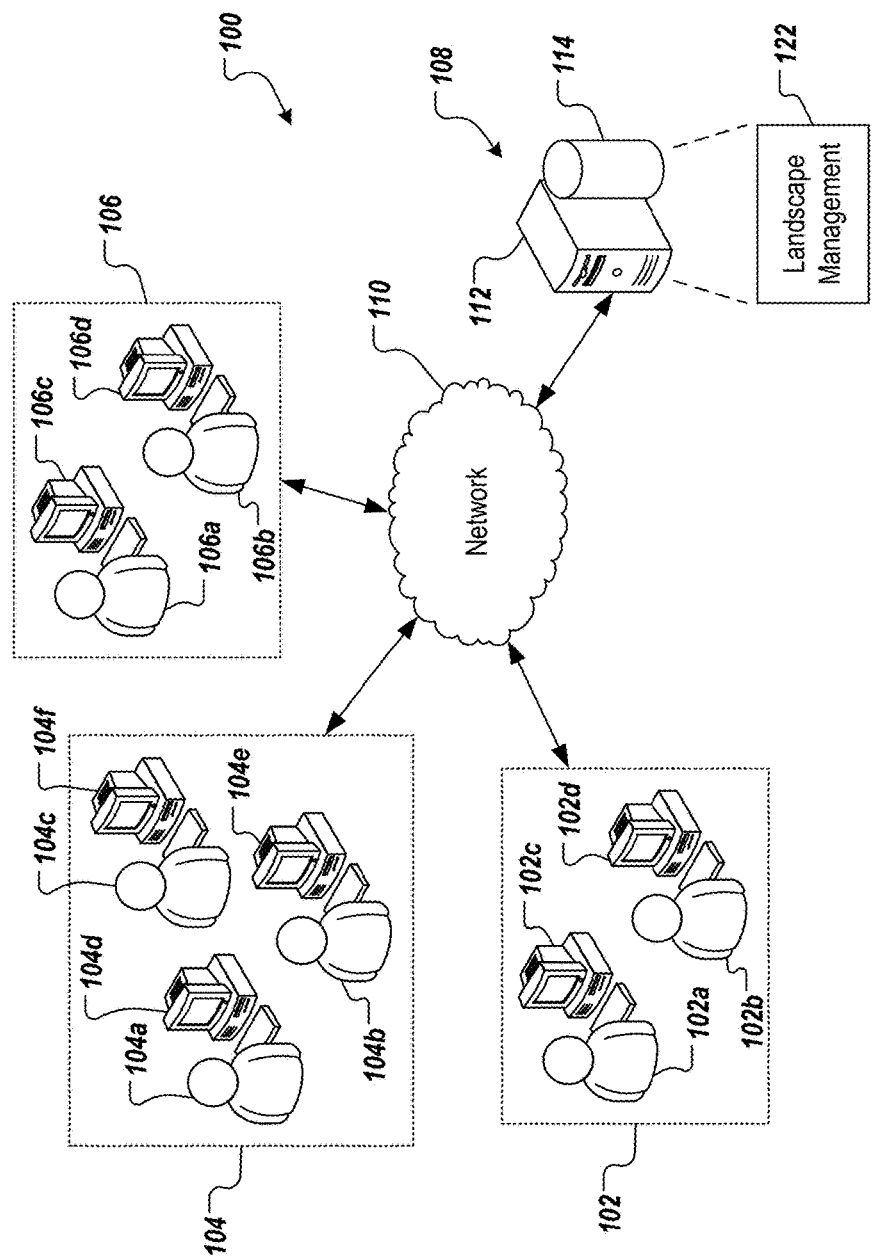
FIG. 1 depicts an example high-level architecture in accordance with implementations of the present disclosure.

FIG. 1 depicts an example architecture 100 in accordance with implementations of the present disclosure. The example architecture 100 is provided as a multi-tenant architecture and includes tenants 102, 104, 106 that communicate with a server system 108 over a network 110. In some examples, each tenant 102, 104, 106 includes multiple users 102a, 102b; 104a, 104b, 104c; 106a, 106b that use respective computing devices 102c, 102d; 104d, 104e, 104f; 106c, 106d to access the server system 108. Although not depicted in FIG. 1, it is also contemplated that a tenant can include a computing device that is not directly operated by a user, such as a server system, and a database system.

In some examples, the computing devices 102c, 102d; 104d, 104e, 104f; 106c, 106d can be computing devices such as laptop computers, desktop computers, smartphones, personal digital assistants, portable media players, tablet computers, or other appropriate computing devices that can be used to communicate with the server system 108. In some implementations, the server system 108 can include one or more computing devices such as a computer server 112 and one or more databases 114. In some implementations, the network 110 can be a public communication network (e.g., the Internet, cellular data network, dialup modems over a telephone network) or a private communications network (e.g., private LAN, leased lines).

Although FIG. 1 includes a multi-tenant configuration, it is contemplated that implementations of the present disclosure can be realized in any appropriate configuration, and are not limited to multi-tenant configurations.

In accordance with implementations of the present disclosure, the server system 108 can be a server system that executes a landscape management system 122. In the context of a multi-tenant architecture, an instance of the landscape management system 122 is used to manage system landscapes of the respective tenants 102, 104, 106. Accordingly, a server instance shared by multiple tenants is provided, where each tenant is provided with a dedicated share of the instance, which is isolated from other shares with regard to performance and data privacy.

In some implementations, one or more data stores of the server system 108 store one or more databases. In some examples, a database can be provided as an in-memory database. In some examples, an in-memory database is a database management system that uses main memory for data storage. In some examples, main memory includes random access memory (RAM) that communicates with one or more processors (e.g., central processing units (CPUs)), over a memory bus. An in-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. An example in-memory database system includes SAP HANA provided by SAP SE of Walldorf, Germany.

As introduced above, and described in further detail herein, implementations of the present disclosure provide for orchestrating custom processes across system landscapes during landscape management. In some examples, landscape management is performed by a computer-implemented management system, such as the SAP Solutions Manager provided by SAP SE of Walldorf, Germany.

In general, the landscape management system manages software systems provided on a plurality of system landscapes of respective users. For example, a first user (e.g., enterprise) can include a first plurality of software applications that make up a first system landscape, and a second user (e.g., enterprise) can include a second plurality of software applications that make up a second system landscape. In some examples, the first system landscape and the second system landscape are unique relative to one another. For example, the first landscape system can include one or more applications, versions of applications, and/or dependencies between applications, among other features, not included in the second system landscape, and vice-versa.

Implementations of the present disclosure provide a platform including a simple, dynamic, and extensible framework for creating and executing custom processes to orchestrate operations across system landscapes. More particularly, and as described in further detail herein, implementations enable entities to create and execute custom processes that are applicable to their respective system landscapes. In some implementations, a custom process includes entity constraints, a directed graph of operations, a relation path per operation, and path constraints. In some examples, an entity constraint identifies a particular entity, on which the process is executable (also referred to as the process source entity). In some examples, an entity is provided as a component of a system landscape. Example entities can include an application, a server system, a database system, and the like. In some examples, the directed graph of operations (operations graph) includes a plurality of nodes, and one or more edges between nodes, each node representing an operation, and each edge representing a transition between nodes. In some examples, a relation path per operation defines a path from the process source entity to a target entity for a particular operation. In some examples, a path constraint identifies a particular entity, on which a respective operation is to be executed.

As described in further detail herein, implementations of the present disclosure provide a relatively easy means for defining dynamic, custom processes, each custom process including a plurality of operations. In accordance with implementations of the present disclosure, all operations of an existing landscape management service (e.g., SAP Solutions Manager) are available for inclusion in custom processes. Accordingly, implementations of the present disclosure enable reuse of all available landscape management operations in a custom process. Further, the platform (also referred to as framework) of the present disclosure builds on the existing operations framework of the landscape management service, and utilizes both a relations framework, and a constraints framework. In accordance with implementations of the present disclosure, users are able to use existing operations as well as to define and use new operations (e.g., which can be referred to as custom operations). Existing operations and/or custom operations can be combined in a custom process. In some examples, an operation within a custom process can even be an existing custom process.

In general, and as made apparent from the descriptions herein, implementations of the present disclosure enable the creation and execution of custom processes within a landscape management service. More particularly, implementations of the present disclosure reuse existing concepts of the landscape management service (e.g., operations, constraints), and provides additional concepts (e.g., relations) to enable custom process orchestration, as described herein.

In some implementations, a user defines a custom process that includes two or more custom process operations. In some examples, the custom process can be defined as a class (CustomProcess), which includes a set of attributes that describe the custom process. For example, CustomProcess implements a respective interface (ICustomProcess), and holds all of the information (e.g., provided from values of the attributes) for the custom process and the constituent operation. Example attributes include, without limitation, an identifier (customProcess_ID) that uniquely identifies the custom process in the landscape management service, a name, a description, a creator (e.g., user ID of the user that created the custom process), a root constraint (rootConstraint) that is a constraint checking whether the custom process is to be executed over a particular system (e.g., a running database system (HANA)), an entity type (entityType) that indicates the particular type (e.g., system, instance, host) of entity that the custom process is applicable to, and an operations graph (described above) that defines the operations included in the custom process. In some examples, the operations graph references one or more operations by respective identifiers, described in further detail below. In this manner, it can be determined, which operations are implicated by the custom process.

In some examples, each operation included in a custom process can be defined as a class (CustomProcessOperation), which includes a set of attributes that describe the operation. For example, CustomProcessOperation implements a respective interface (ICustomProcessOperation), and holds all of the information (e.g., provided from values of the attributes) for execution of the respective operation. Example attributes include, without limitation, an identifier (ID) that uniquely identifies the operation, an operation identifier (operation_ID) that references the operation within the landscape management service, an operation type (operationType) (e.g., normal, custom), a path, which is provided as a set of relation nodes that represents a path from the process source entity to entities, on which the operation is to be executed (e.g., if empty, the operation executes over the process source entity), and constraints for resolving entities (e.g., if an entity meets the constraint(s), the operation is executed on the entity). In some examples, a constraint can be a static constraint, or a dynamic constraint. In some examples, a static constraint is based on a state of the entity that remains static (e.g., an entity identifier). In some examples, a dynamic constraint is based on a state of the entity that can change over time (e.g., whether the entity is running). In some implementations, a user defines a custom process using one or more UIs that enable the user to provide attribute values for the CustomProcess class, and to define attribute values for respective classes CustomProcessOperation of one or more operations to be executed through the custom process.

Figure 2:
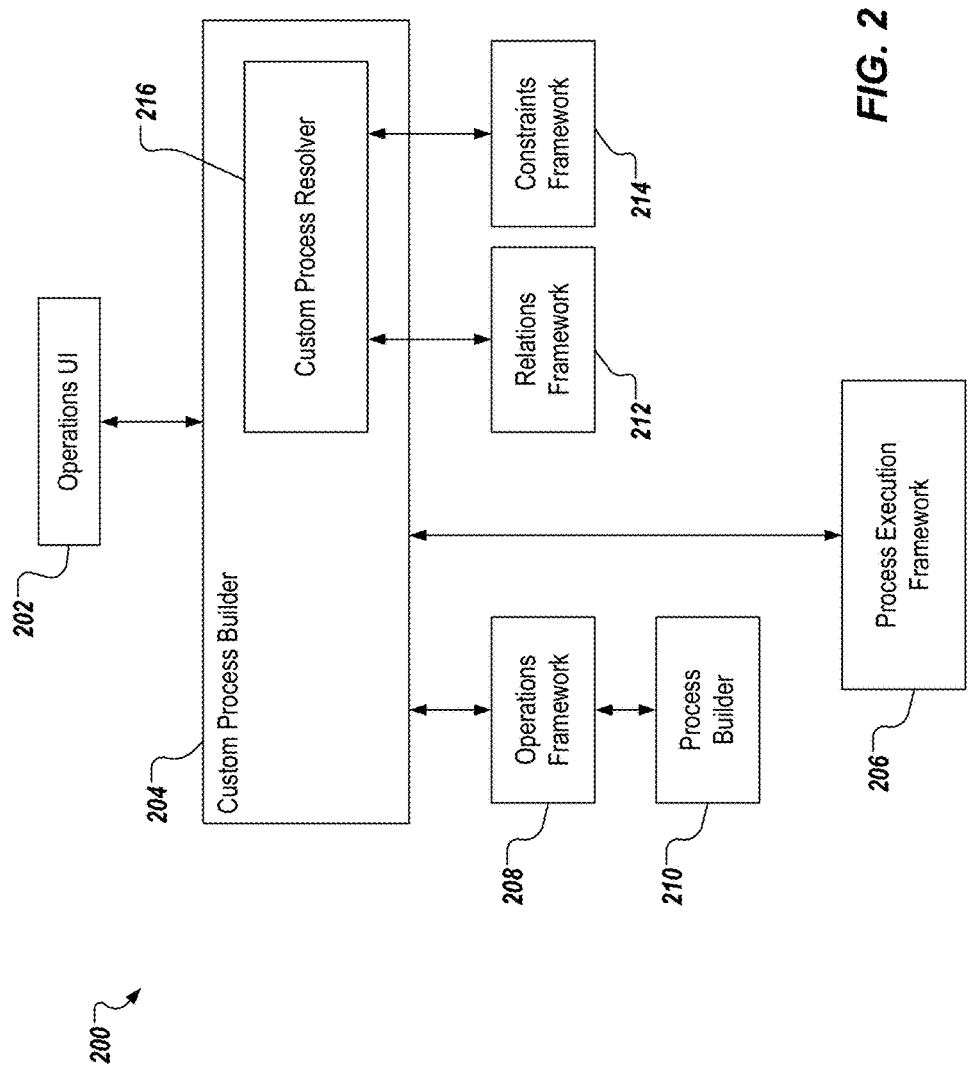
FIG. 2 depicts an example architecture for orchestrating processes in accordance with implementations of the present disclosure.

FIG. 2 depicts an example architecture 200 for orchestrating processes across landscapes in accordance with implementations of the present disclosure. In the depicted example, the example architecture 200 includes one or more operations UIs 202, a custom process builder 204, a process execution framework 206, an operations framework 208, a process builder 210, a relations framework 212, and a constraints framework 214. The custom process builder 204 includes a custom process resolver 216. In some examples, one or more of the components of the example architecture 200 are each provided as a class, and/or one or more computer-executable programs executed by a computing device.

In some implementations, the custom process builder 204 is provided as a class (CustomProcessBuilder), and is responsible for execution of custom processes. In some examples, the custom process builder 204 interprets the user requirements from the attributes of the class CustomProcess, and uses modules of the landscape management service to create and execute concrete processes over concrete entities. In some implementations, the custom process resolver 216 is provided as a class (CustomProcessResolver) that resolves the particular entities for each operation (e.g., each CustomProcessOperation provided in the operation graph of the CustomProcess).

In some implementations, the relations framework 212 identifies relations between entities implicated in operations of the custom process that is to be executed. In some examples, relations between entities are determined at least partially based on the path attribute of each operation (e.g., each CustomProcessOperation identified in CustomProcess). In some implementations, the constraints framework 214 checks each of the implicated entities (resolved entities from the custom process resolver 216) against one or more constraints (static, dynamic). In some examples, if an entity meets the constraint, the respective operation is to be executed over the entity. In some examples, if an entity does not meet the constraint, the respective operation is not to be executed over the entity. An example constraint can include that a particular entity (e.g., Entity_ID XYZ) is running. In this example, if the particular entity is running, the constraint is met, and if the particular entity is not running, the constraint is not met.

In some implementations, the operations framework 208 interacts with the process builder 210 to define a process for specific operations that are to be executed over specific entities in view of constraints and relations. In some examples, the operations framework 208 returns a set of computer-executable instructions that define one or more operations that are to be executed on a set of entities (e.g., one or more entities). In some examples, the process includes less than all of the operations defined in the custom process. For example, one or more constraints may result in an operation of the custom process not being executed on one or more entities. In some implementations, the process execution framework 206 receives the process, and executes the process over entities in the set of entities.

Figure 3:
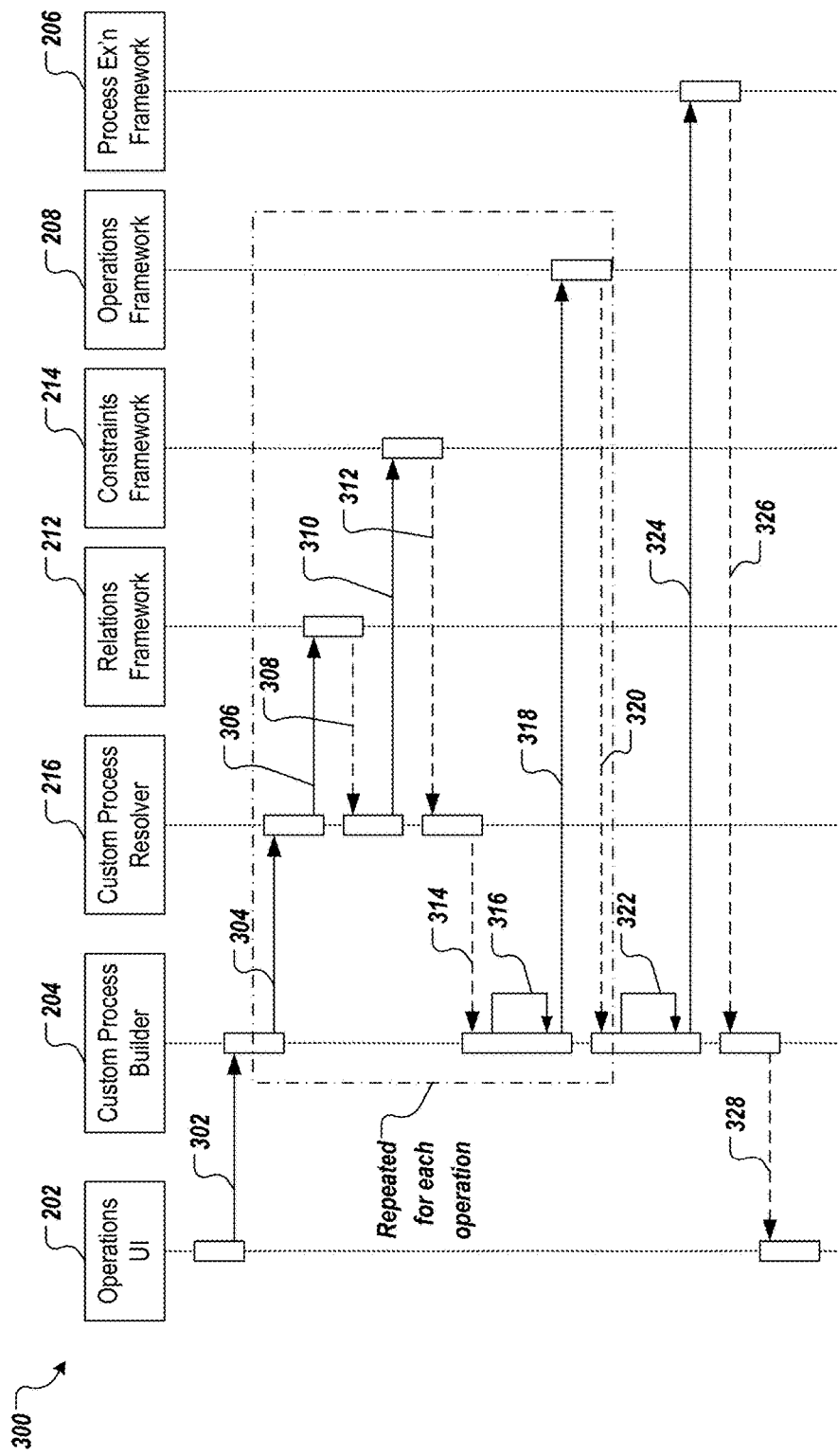
FIG. 3 depicts an example workflow diagram in accordance with implementations of the present disclosure.

FIG. 3 depicts an example workflow diagram 300 in accordance with implementations of the present disclosure. In some implementations, a request to execute a custom process is received (302) by the custom process builder 204 from the operations UI 202. For example, a user uses the operations UI to identify a custom process that is to be executed, and to initiate execution of the custom process. In some examples, the request includes the identifier (e.g., customProcess_ID), which uniquely identifies the custom process that is to be executed. In some examples, the custom process builder 204 determines the operations implicated by the custom process based on the attributes of the custom process (e.g., referencing the operations graph that defines the operations included in the custom process.

In some implementations, the custom process builder 204 provides (304) a resolution request to the custom process resolver 216. In some examples, the resolution request includes an operation of a set of operations implicated by the custom process. For example, the set of operations is determined from the operations graph. In some examples, the set of operations is provided as a list of operation identifiers (e.g., operation_ID), each operation identifier being assigned to an operation that is implicated by the custom process. In some implementations, the custom process resolver 216 provides (306) a path resolution request to the relations framework 212. In some examples, the path resolution request includes an operation of the set of operations. In some examples, the relations framework 212 determines a path for the operation, the path indicating one or more entities implicated by the operation. For example, the relations framework 212 determines a relation path based on the path attribute of the operation. The relations framework returns (308) a set of entities to the custom process resolver 216, the set of entities including one or more entities implicated by the operation.

In some implementations, the custom process resolver 216 provides (310) a constraint check request to the constraints framework 214. In some examples, the constraint check request includes the set of entities and the operation identifier for the operation of the set of operations. In some examples, the constraints framework 214 determines a set of constraints of the operation, the set of constraints indicating one or more constraints to be applied to respective entities. For example, the constraints framework 214 determines the set of constraints from the constraints attribute of the operation. In some examples, the constraints framework 214 compares each entity, and/or a status of each entity in the set of entities to one or more constraints that are applicable to the entity. If the entity meets the constraint, the entity remains in the set of entities. If the entity does not meet the constraint, the entity is filtered (removed) from the set of entities.

In this manner, the constraints framework 214 provides a sub-set of entities. In some examples, the sub-set of entities includes the same entities as the set of entities provided to the constraints framework 214 (e.g., no entities are filtered). In some examples, the sub-set of entities includes fewer entities than the set of entities provided to the constraints framework 214 (e.g., one or more entities are filtered). The constraints framework provides (312) the sub-set of entities to the custom process resolver 216, which provides (314) the sub-set of entities to the custom process builder 204.

In some implementations, the custom process builder 204 generates (316) an operation request based on the sub-set of entities. The custom process builder 204 provides (318) the operation request to the operations framework 208. The operations framework 208 processes the operation request to provide (320) an operation process to the custom process builder 204. In some examples, the operation request includes the identifier of the operation, and identifiers of the entities, on which the operation will be executed. In some examples, the operation request can also include instructions on how to execute operation. The operation framework interprets the request, and based on the operation and entities, provides the operation process as a directed graph. In some examples, the operation process includes a set of actions to be performed on respective entities.

In some implementations, the actions 304, 306, 308, 310, 312, 314, 316, 318, 320 are repeated for all operations required by the custom process. In this manner, a set of operation processes is provided for the customized process. In some examples, the set of operation processes includes two or more operation processes. The custom process builder 204 combines (322) the operation processes of the set(s) of operation processes into a single process. In some examples, and as discussed above, each operation process is represented as a directed graph (e.g., including several steps (vertices) that are executed in parallel, or sequentially, and connected by edges). In some examples, if there is an edge between two operations defined in the custom process, the processes are combined by: adding edges between all vertices of the first directed graph without outgoing edges, and all vertices of the second directed graph without incoming edges. In some examples, to make sure that the second operation process is executed after the first operation process is completed, the "last steps" of the first operation process are connected to the "first steps" of the second operation process. If there is no edge between the two operations defined in the custom process, no edges are added between the two operation processes (e.g., they are executed in parallel). The custom process builder 204 provides (324) an execution request to the process execution framework 206, which executes the process. The process execution framework returns (326) a process identifier (processID) to the custom process builder 204, which returns (328) the process identifier to the operations UI 202. In some examples, the processID is a unique identifier (UUID) of the process, which allows the user to track the process including all steps and monitor the execution.

Figure 4:
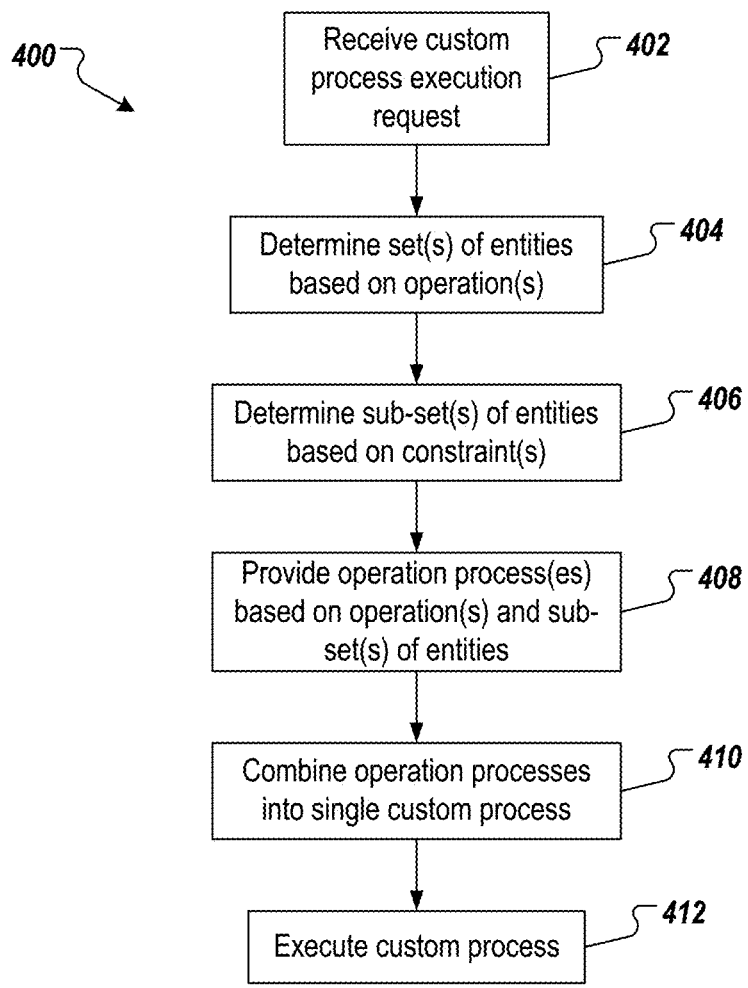
FIG. 4 depicts an example process that can be executed in accordance with implementations of the present disclosure.

FIG. 4 depicts an example process 400 that can be executed in accordance with implementations of the present disclosure. In some examples, the example process 400 can be provided by one or more computer-executable programs executed using one or more computing devices.

A request is received to execute a custom process (402). For example, a user can interact with the operations UI 202 to select a custom process that is to be executed on a target system, as described above, and in further detail with reference to FIGS. 5A-5C below. One or more sets of entities are determined based on the operation(s) of the custom process (404). For example, for each operation in the custom process, a set of entities is determined, as described herein, and includes one or more entities, over which the respective operation is to be executed. One or more sub-sets of entities are determined based on one or more constraints (406). For example, one or more entities can be filtered from a set of entities based on one or more constraints to provide a respective sub-set of entities. One or more operation processes are provided based on the operation(s) and the sub-set(s) of entities (408). For example, for each operation in the custom process, an operation process is provided, as described herein. The operation processes are combined into a single custom process (410), and the custom process is executed (412).

Figure 5A:
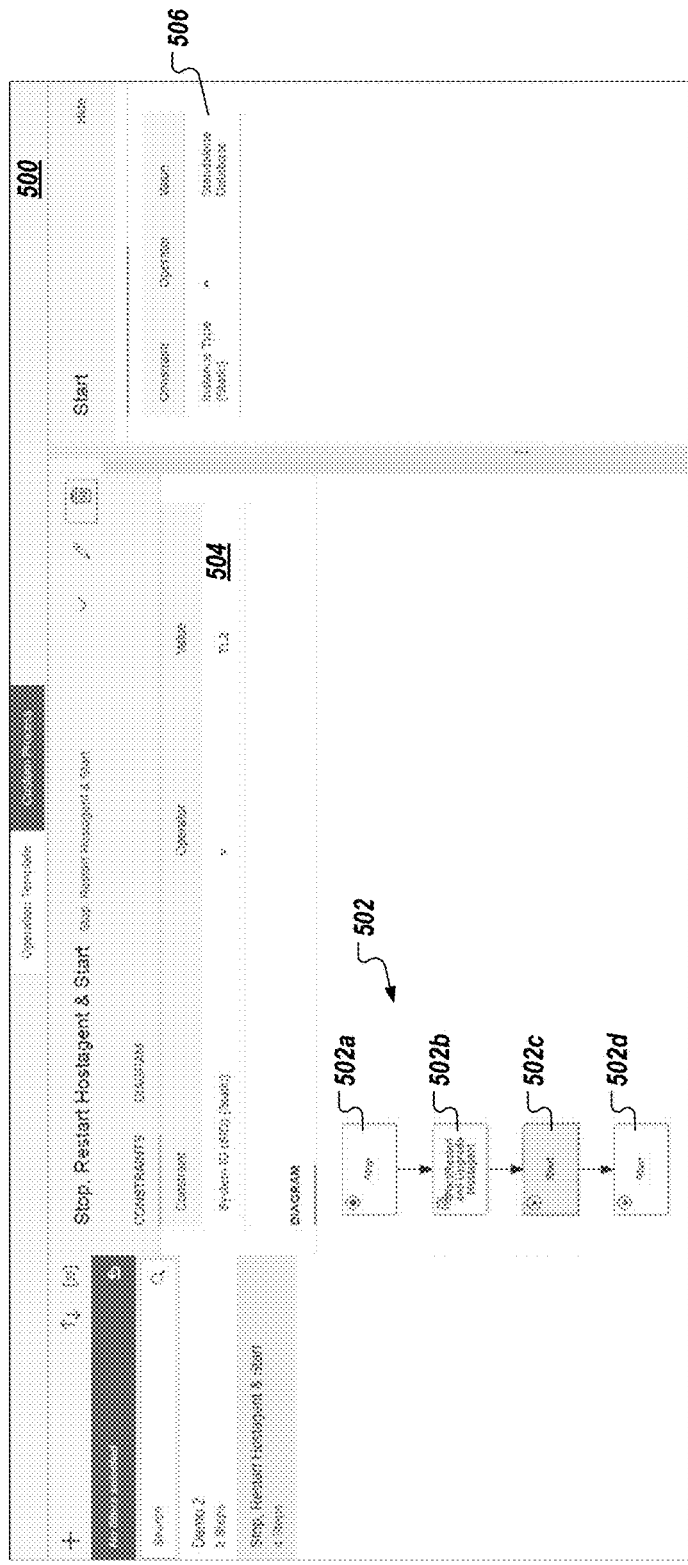
FIGS. 5A-5C depict example user interfaces (UIs) in accordance with implementations of the present disclosure.
Figure 5B:
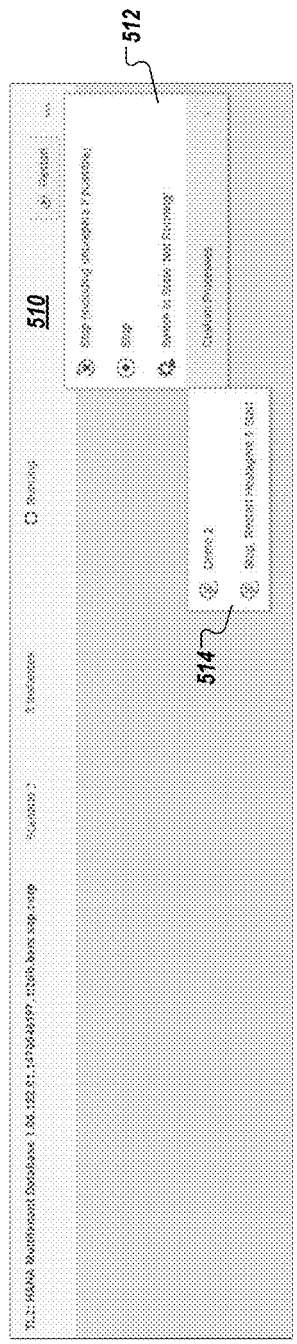
Figure 5C:
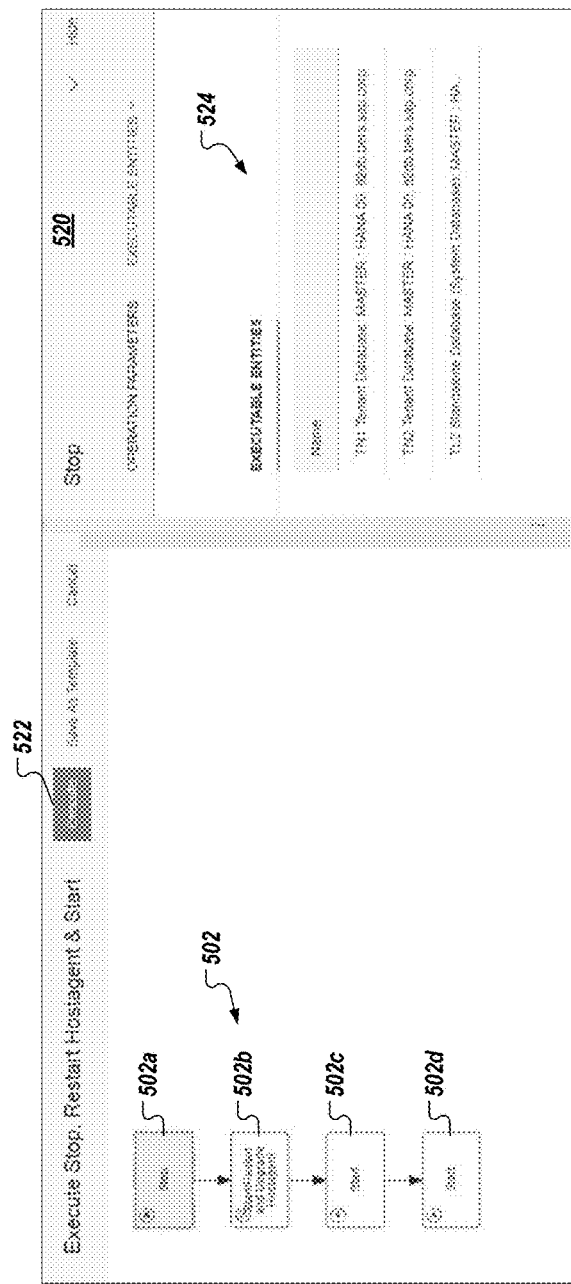
Figure 6:
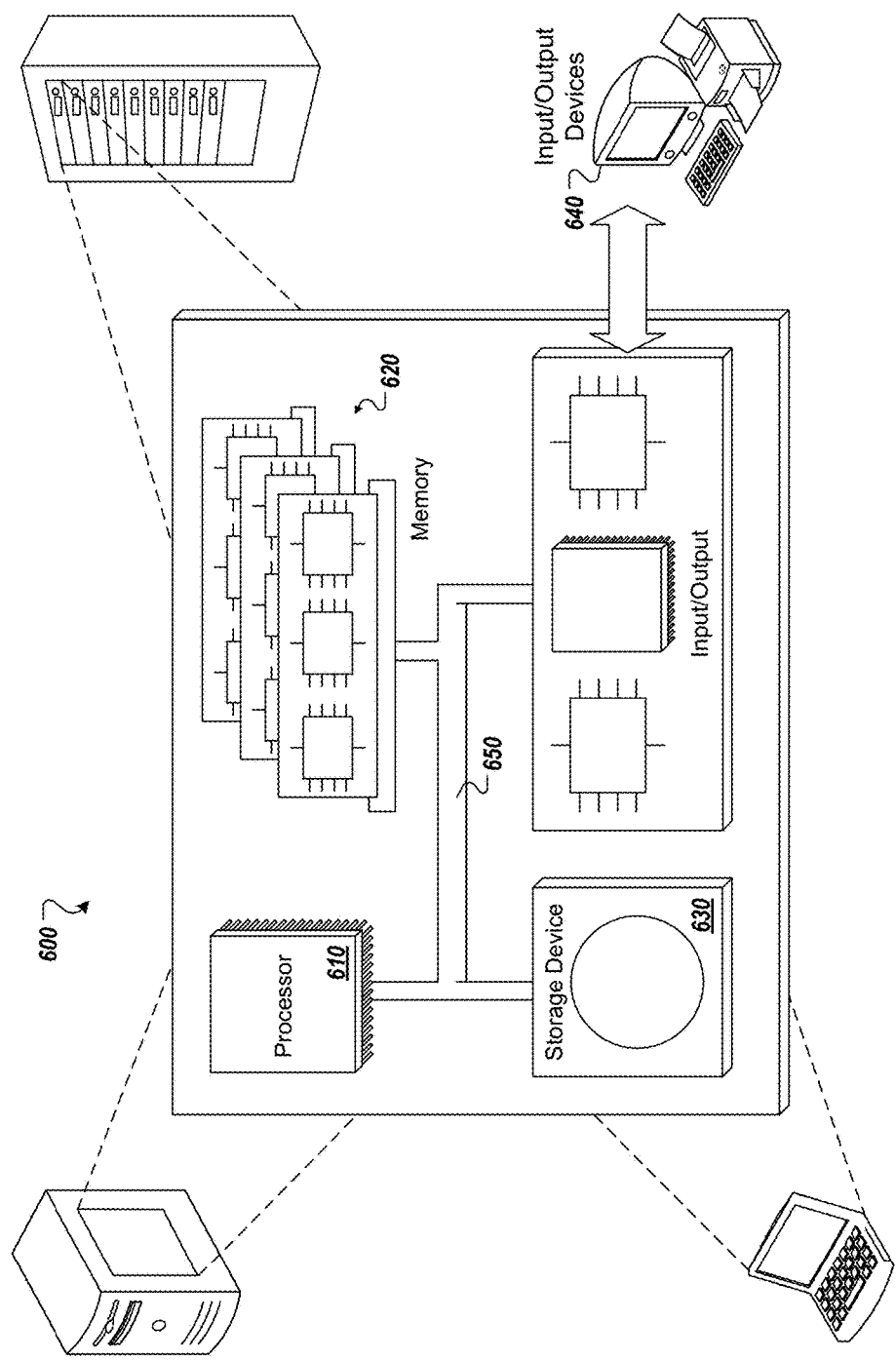
FIG. 6 is a schematic illustration of example computer systems that can be used to execute implementations of the present disclosure.

FIGS. 5A-5C depict example user interfaces (UIs) in accordance with implementations of the present disclosure.

In the example of FIG. 5A, a definition UI 500 is depicted. In some examples, a user can define a custom process using the definition UI 500. In the depicted example, a custom process 502, "Stop, Restart Hostagent & Start" is defined for a system TL2. For example, a static constraint 504 is provided and indicates that the System ID is equal to TL2. The custom process 502 includes operations stop of the whole system (operation Stop 502a), restart of host agent (operation Restart 502b), start of system DB (operation Start 502c), and start of tenant DBs (operation Start 502d). In the depicted example, the operation Start 502c is selected, and includes a static constraint 506. The static constraint 506 indicates that the instance type is equal to standalone database (e.g., the operation Start 502c is to only execute on standalone databases). Although not depicted in FIG. 5A, the operation 502d, for example, can include a static constraint that indicates that the instance type is equal to tenant database.

In the example of FIG. 5B, a process options UI 510 is depicted. In some examples, the process options UI 510 displays processes that are available for respective systems. In the example of FIG. 5B, a system having the System ID TL2 is selected. A menu 512 is displayed and provides processes that are available for the particular system. In the depicted example, the processes include Stop (including unprepared if possible), Stop, Switch to State 'Not Running,' and Custom Processes. The Custom Processes option is selected from the menu 512, and a sub-menu 514 is displayed. In the depicted example, the sub-menu 514 indicates that the custom process "Demo 2," and the custom process "Stop, Restart Hostagent & Start" are available for the selected system, TL2. For example, and referring again to FIG. 5A, the custom process 502 includes the static constraint 504, making the custom process 502 available for the system TL2.

In the example of FIG. 5C, an execution UI 520 is depicted. For example, the execution UI 520 can be displayed in response to user selection of a process from the process options UI 510 of FIG. 5B. In the depicted example, the execution UI 520 can be displayed in response to user selection of the custom process "Stop, Restart Hostagent & Start" from the sub-menu 514 of FIG. 5B. In some examples, the selected process is displayed. For example, the custom process 502 is graphically depicted within the execution UI 520. In some examples, the user can initiate execution of the process by selecting an execution option 522. In the depicted example, the custom process 502 is to be executed, and the operation 502a is selected. In some examples, and as described in detail herein, entities implicated by the operation are determined (e.g., based on relations and constraints). In the example of FIG. 5C, a list of entities 524 is provided, and identifies the entities, over which the operation 502a is executed.

Implementations of the present disclosure provide one or more of the following example advantages. In some examples, implementations of the present disclosure enable users to define processes, which can be relatively complex (e.g., many operations and branching), dynamic (considering runtime data, through constraints (e.g., a start operation will not be executed on an already started instance)), and can be applied to multiple entities (using relations, referencing the relevant entities through an abstracted description). In some examples, existing processes can be reused as sub-processes, enhancing reusability.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. The components 710, 720, 730, 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit. The storage device 730 is capable of providing mass storage for the system 700. In one implementation, the storage device 730 is a computer-readable medium. In various different implementations, the storage device 730 may be a floppy disk device, a hard disk device, an optical disk device, or a tape device. The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for custom processes execution over a plurality of entities in a landscape management service, the method being executed by one or more processors and comprising:
   receiving, by a custom process builder, a request to execute a custom process over a target system, the request being sent by a user and comprising an identifier of the custom process, the custom process comprising one or more operations;
   determining, by the one or more processors, and for each operation of the custom process, a set of entities implicated by a respective operation based on an operations graph of the custom process, relations paths of the respective operation, each entity comprising a component of a system landscape, on which the custom process is executable, the operations graph being configured to reference each operation by a respective identifier;
   determining, by the one or more processor, and for each set of entities, a sub-set of entities based on one or more constraints of the respective operation, each constraint comprising one of a static constraint based on a first state of a respective entity that remains static and a dynamic constraint based on a second state of the respective entity that is changeable over time, and the respective entity being included in the sub-set of entities for execution of the respective operation thereon, if the constraint is met;
   providing, by the one or more processors, and for each operation of the custom process, an operation process that is to be executed over one or more entities of a respective sub-set of entities;
   combining, by the one or more processors, operation processes into a single custom process; and
   initiating, by the one or more processors, execution of the single custom process.

2. The method of claim 1, wherein determining sets of entities and sub-sets of entities is performed by a custom process resolver based on input provided from a relations framework and a constraints framework.

3. The method of claim 1, wherein the custom process is defined as a class comprising attributes.

4. The method of claim 1, wherein an operation is defined as a class including at least one constraint, and at least one relation.

5. The method of claim 1, wherein the operations graph comprises a computer-readable representation of a directed graph comprising nodes and edges between nodes.

6. The method of claim 1, wherein the static constraint indicates that an instance type of the respective entity is equal to a particular database and the dynamic constraint indicates whether a start operation is executable based on a current instance of the respective entity.

7. The method of claim 1, wherein each operation of the one or more operations comprises an operation for landscape management of a system landscape including the target system.

8. A non-transitory computer-readable storage medium coupled to one or more processors and having instructions stored thereon which, when executed by the one or more processors, cause the one or more processors to perform operations for custom processes execution over a plurality of entities in a landscape management service, the operations comprising:
   receiving, by a custom process builder, a request to execute a custom process over a target system, the request being sent by a user and comprising an identifier of the custom process, the custom process comprising one or more operations;
   determining, for each operation of the custom process, a set of entities implicated by a respective operation based on an operations graph of the custom process, relations paths of the respective operation, each entity comprising a component of a system landscape, on which the custom process is executable, the operations graph being configured to reference each operation by a respective identifier;
   determining, for each set of entities, a sub-set of entities based on one or more constraints of the respective operation, each constraint comprising one of a static constraint based on a first state of a respective entity that remains static and a dynamic constraint based on a second state of the respective entity that is changeable over time, and the respective entity being included in the sub-set of entities for execution of the respective operation thereon, if the constraint is met;
   providing, for each operation of the custom process, an operation process that is to be executed over one or more entities of a respective sub-set of entities;
   combining operation processes into a single custom process; and
   initiating execution of the single custom process.

9. The computer-readable storage medium of claim 8, wherein determining sets of entities and sub-sets of entities is performed by a custom process resolver based on input provided from a relations framework and a constraints framework.

10. The computer-readable storage medium of claim 8, wherein the custom process is defined as a class comprising attributes.

11. The computer-readable storage medium of claim 8, wherein an operation is defined as a class including at least one constraint, and at least one relation.

12. The computer-readable storage medium of claim 8, wherein the operations graph comprises a computer-readable representation of a directed graph comprising nodes and edges between nodes.

13. The computer-readable storage medium of claim 8, wherein the static constraint indicates that an instance type of the respective entity is equal to a particular database and the dynamic constraint indicates whether a start operation is executable based on a current instance of the respective entity.

14. The computer-readable storage medium of claim 8, wherein each operation of the one or more operations comprises an operation for landscape management of a system landscape including the target system.

15. A system, comprising:
a computing device; and
a computer-readable storage device coupled to the computing device and having instructions stored thereon which, when executed by the computing device, cause the computing device to perform operations for custom processes execution over a plurality of entities in a landscape management service, the operations comprising:
receiving, by a custom process builder, a request to execute a custom process over a target system, the request being sent by a user and comprising an identifier of the custom process, the custom process comprising one or more operations;
determining, for each operation of the custom process, a set of entities implicated by a respective operation based on an operations graph of the custom process, relations paths of the respective operation, each entity comprising a component of a system landscape, on which the custom process is executable, the operations graph being configured to reference each operation by a respective identifier;
determining, for each set of entities, a sub-set of entities based on one or more constraints of the respective operation, each constraint comprising one of a static constraint based on a first state of a respective entity that remains static and a dynamic constraint based on a second state of the respective entity that is changeable over time, and the respective entity being included in the sub-set of entities for execution of the respective operation thereon, if the constraint is met;
providing, for each operation of the custom process, an operation process that is to be executed over one or more entities of a respective sub-set of entities;
combining operation processes into a single custom process; and
initiating execution of the single custom process.

16. The system of claim 15, wherein determining sets of entities and sub-sets of entities is performed by a custom process resolver based on input provided from a relations framework and a constraints framework.

17. The system of claim 15, wherein the custom process is defined as a class comprising attributes.

18. The system of claim 15, wherein an operation is defined as a class including at least one constraint, and at least one relation.

19. The system of claim 15, wherein the operations graph comprises a computer-readable representation of a directed graph comprising nodes and edges between nodes.

20. The system of claim 15, wherein the static constraint indicates that an instance type of the respective entity is equal to a particular database and the dynamic constraint indicates whether a start operation is executable based on a current instance of the respective entity.

* * * * *